May 28, 1968 R. E. McMINN 3,385,031
GAS AND LIQUID SEPARATOR
Filed March 3, 1966 3 Sheets-Sheet 1
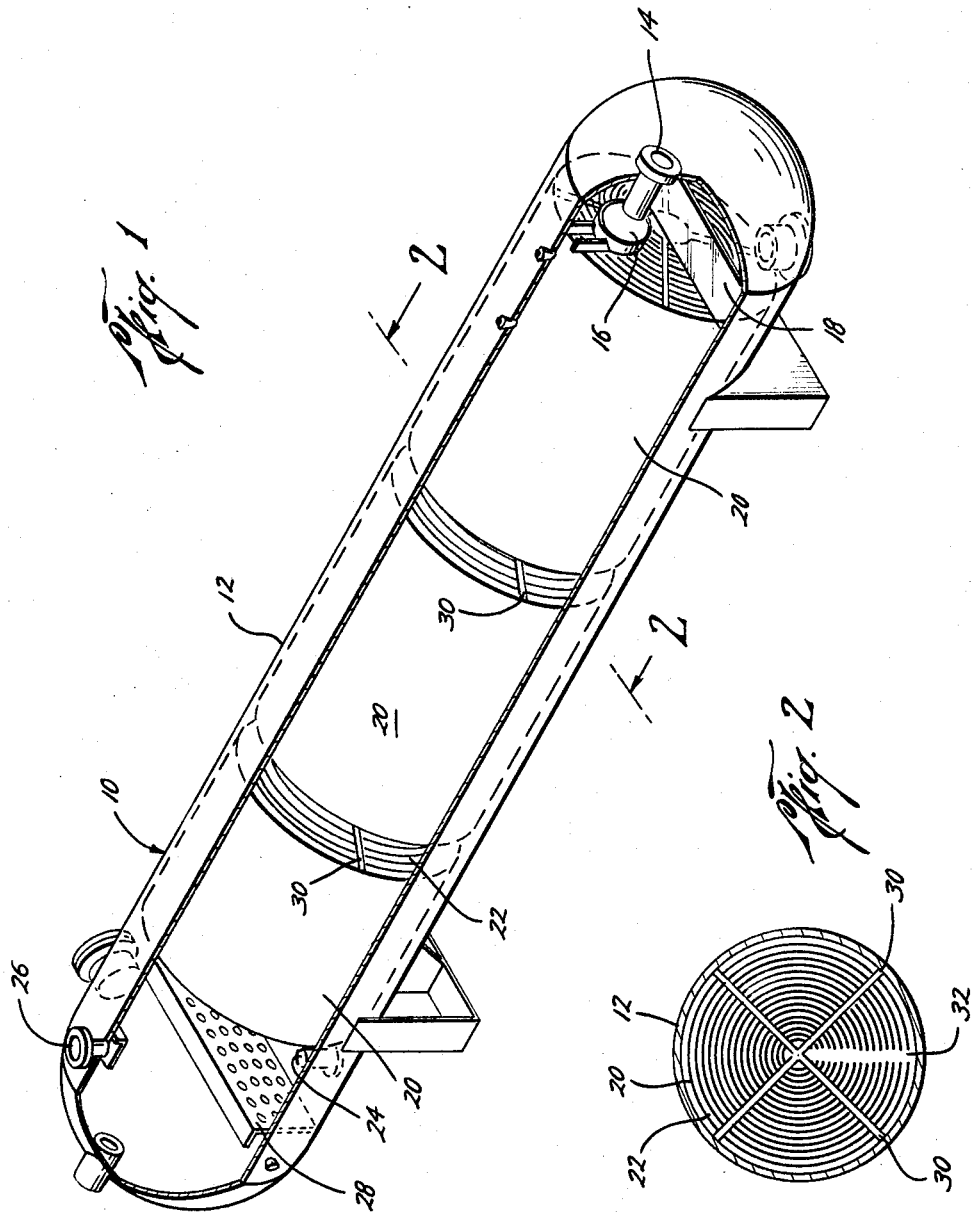
Robert E. McMinn
INVENTOR.
James F. Weiler
Jefferson D. Giller
BY William A. Stout
Paul L. DeVerter II
Dudley R. Dobie, Jr.
ATTORNEYS

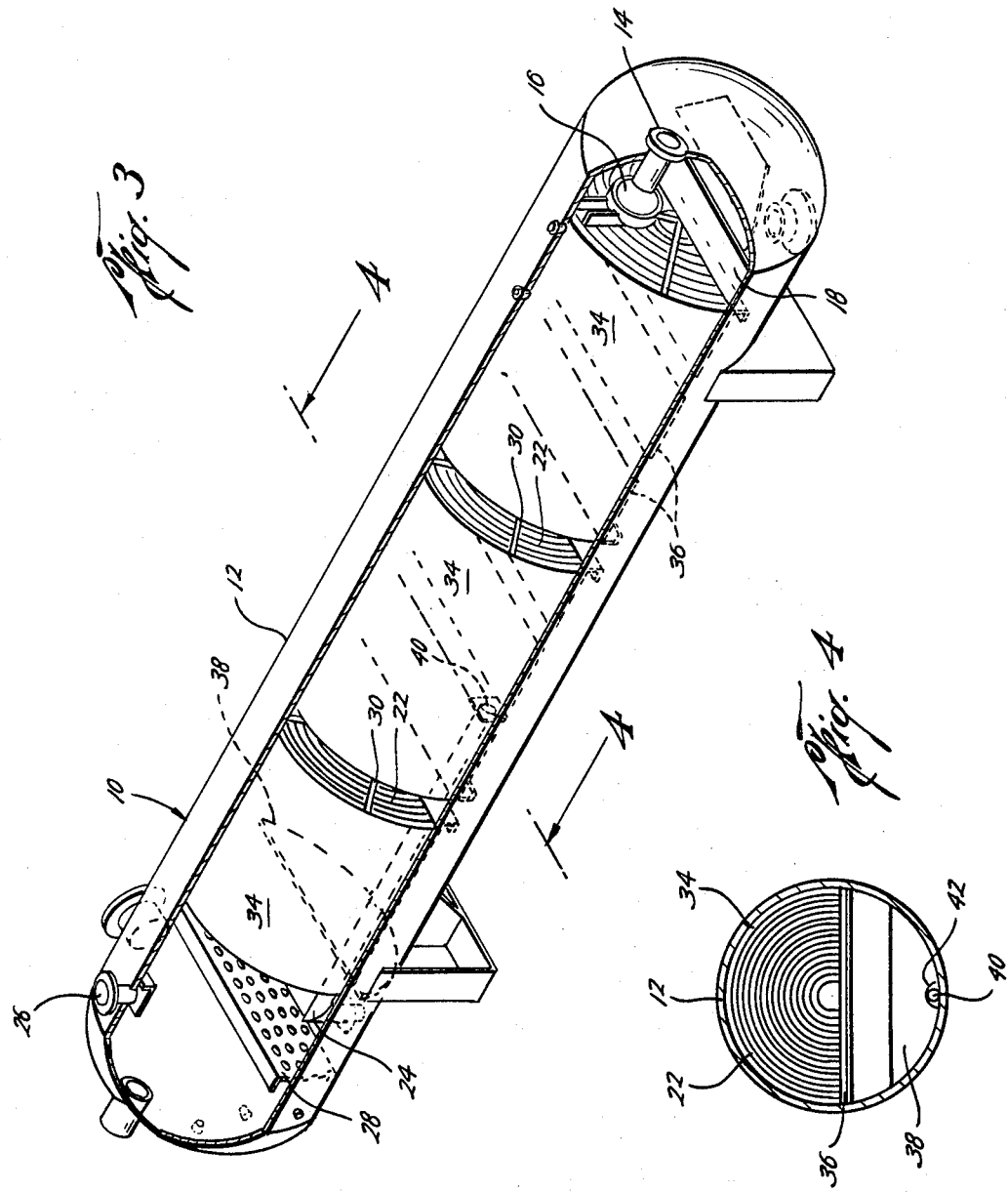

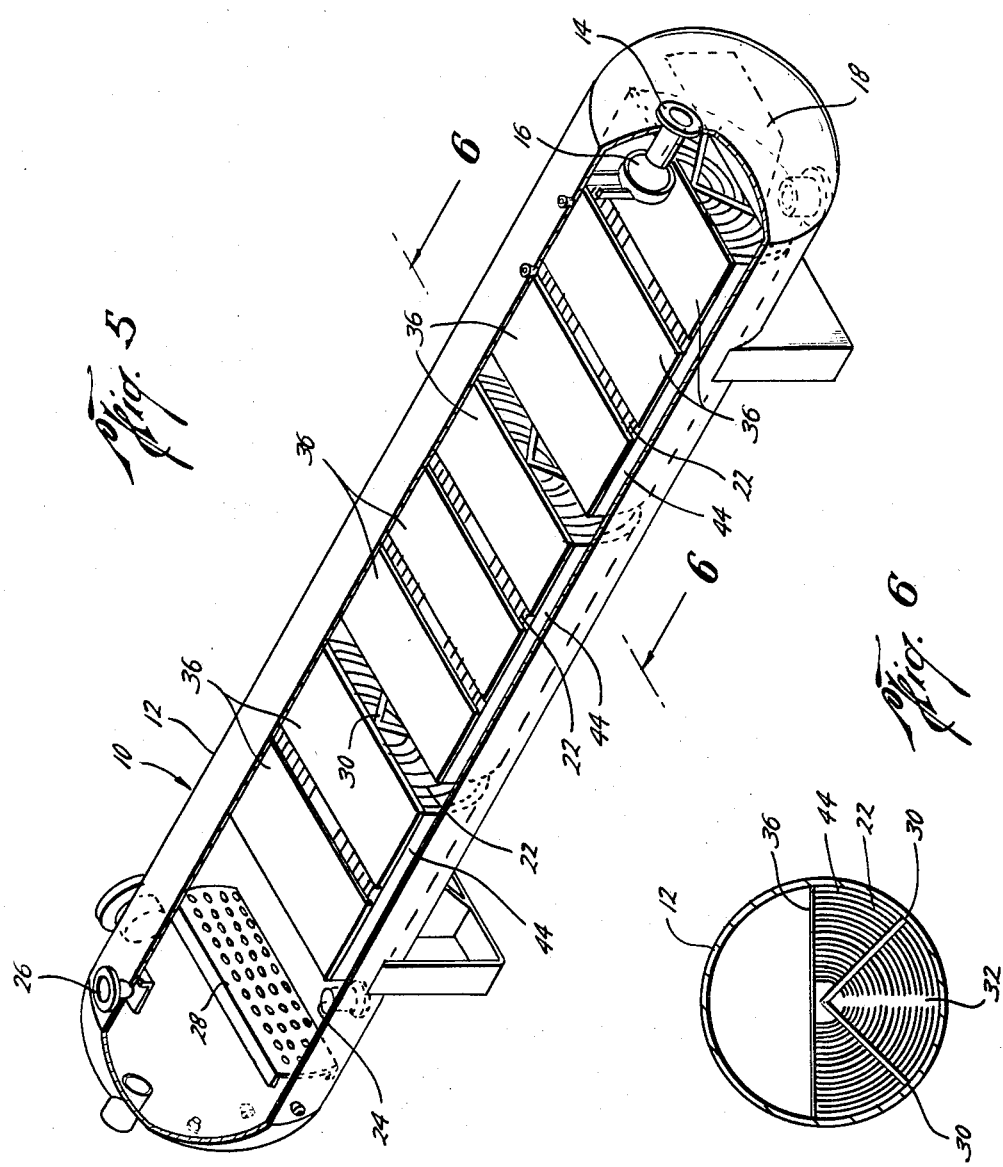

United States Patent Office 3,385,031
Patented May 28, 1968

3,385,031
GAS AND LIQUID SEPARATOR
Robert Edward McMinn, Oklahoma City, Okla., assignor to Black, Sivalls & Bryson, Inc., Kansas City, Mo., a corporation of Delaware
Filed Mar. 3, 1966, Ser. No. 531,552
10 Claims. (Cl. 55—202)

ABSTRACT OF THE DISCLOSURE

The present invention relates to an apparatus for separating gas and liquids in petroleum streams by gravitational and coalescent action. Smooth, circular plates are disposed longitudinally and concentrically within a horizontal vessel wherein the petroleum stream enters at one end and the separated components exit at the opposite end.

---

The horizontal type of gas and liquid separator has long been used for separating gases from liquids in petroleum fluid streams. Horizontal separators have generally comprised flat internal coalescing plates in one form or another within a vessel whereby liquid particles entrained in the gas and gas particles entrained in the liquid of the fluid coalesce on such plates to effect separation of the phases.

Separators with flat coalescing plates such as the type disclosed in United States Letters Patent No. 2,349,944 issued May 30, 1944 to Dixon have been efficient for phase separation purposes but have lacked structural strength in the plate sections. In most cases, flat coalescing plates are relatively long and are constructed of low gauge materials to provide maximum surface area for a particular vessel diameter. Frequently flat plate separators malfunction in operation due to sag of individual plates since they are generally installed within the separator vessel by securing only the ends of the plates to the vessel. The plates also tend to become dislodged during handling of the separator prior to installation.

In instances where petroleum streams are high in heavy paraffinic or high melting point substances, such heavy material collects on separator coalescing plates and builds up to the point where thorough cleaning of the separator becomes necessary. In such a case, the separator must be shut down and steamed or otherwise cleaned to remove the accumulated substances. In the cleaning operation, the paraffin or other heavy clogging material drains from the plates by gravity flow further clogging drainage ducts located in the flat plates along the walls of the vessel and making the cleaning operation very difficult.

The present invention is directed to an improved horizontal separator having circular coalescing plates which obviate the difficulties encountered with the conventional flat plates and which offer structural rigidity, are easily installed within a separator vessel, and which can be cleaned expeditiously without the problem of pluggage.

It is, therefore, an object of the present invention to provide an improved horizontal separator for use in separating gas from liquids in petroleum fluid streams through the use of circular coalescing plates.

Another object of the present invention is to provide an improved separator for separating gas from liquids wherein the coalescing section is structurally rigid to prevent sagging and displacement of plates within the section.

A further object of the present invention is to provide an improved horizontal separator having circular plates as a coalescing section from which accumulated paraffinic or higher melting point materials may be easily removed without pluggage of drainage ducts.

Yet a further object of the present invention is the provision of an improved horizontal separator provided with a coalescing section of smooth circular plates having a full circle configuration with drainage means formed in the lowermost portion of each plate, whereby flow of a petroleum stream through the section induces coalescence of liquid particles entrained in the gas and gas particles entrained in the liquid, said plates at the same time breaking any foam present in the well stream.

Yet another object of the present invention is the provision of an improved horizontal separator having a coalescing section of smooth circular plates of an approximate half-circle configuration conforming with and secured within the upper portion of the separator vessel inducing coalescene of liquid particles entrained in a gas upon passage of a petroleum stream therethrough.

Still another object of the present invention is the provision of a horizontal separator having a coalescing section comprised of smooth circular plates of an approximate half-circle configuration conforming with and secured within the lower portion of the separator vessel with drainage means in the lower portion of each plate whereby coalescence and separation of immiscible liquid particles entrained in separate liquid phases is induced upon the flow of a petroleum stream therethrough.

Other and further objects, features and advantages will be apparent from the following description of a presently preferred embodiment of the invention given for the purpose of disclosure, taken in conjunction with the accompanying drawings, wherein like character references designate like parts throughout the several views and where:

FIGURE 1 is a partial perspective view of a separator according to the present invention having a coalescing section of plates with a full circle configuration, FIGURE 2 is a cross-sectional end view taken along the line 2—2 of FIGURE 1 and showing drainage means in the lower portion of each plate of the coalescing section, FIGURE 3 is a partial perspective view of a horizontal separator according to the present invention within the coalescing section comprises plates of a half-circle configuration positioned in the upper portion of the separator vessel, FIGURE 4 is a cross-sectional end view taken along the line 4—4 of FIGURE 3, FIGURE 5 is a partial perspective view of a horizontal separator according to the present invention wherein the coalescing section comprises plates in a half-circle configuration positioned in the lower portion of the separator vessel, and FIGURE 6 is a cross-sectional end view taken along the line 6—6 of FIGURE 5 showing the drainage channel in the lower portion of each plate.

The present invention generally comprises an improved horizontal separator for separating gas and liquids in a petroleum stream having a coalescing section within the separator vessel comprising smooth circular plates in full circle or approximate half-circle configurations or variations thereof. Gas may be separated from liquids in the well stream through coalescence on the plates of liquid particles entrained in the gas and gas particles entrained in the liquid.

Referring now to the drawings and particularly to FIGURE 1, the reference numeral 10 generally refers to the improved horizontal separator of the present invention. The separator comprises an elongate horizontal or at least substantially horizontal vessel 12 having a petroleum stream inlet 14 at one end thereof to receive the fluid to be separated. A deflector plate 16 secured to the vessel 12 is provided to knock out any slugs of fluid entering the separator and a dispersion baffle 18 is located in the center portion of the vessel to help disperse the entering fluid as well as maintain separation of liquid and gas.

The coalescing section of the separator as shown in FIGURE 1 comprises circular plates 20 in a plurality of sections as shown. The plates are smooth and are of a full circle configuration disposed longitudinally and concentrically spaced within the vessel 12 so that annular flow passages 22 are provided between the plates.

A liquid outlet pipe 24 and gas outlet pipe 26 are provided at the end of the separator opposite or remote from the end containing the inlet 14. In addition, a perforated vertical baffle 28 is located in the lower portion of the separator to quiet the liquid level so that conventional level control equipment may be used to control operation of the separator.

With reference to FIGURE 2, the separator is shown in cross-section. Proper spacing of the plates is maintained by the use of support members 30 which are suitable bars welded or otherwise secured to the end of each plate and supported within the vessel 12. The plates 20 may be formed of any suitable material so long as such material is smooth for coalescent activity and is of the proper gauge to permit installation of the requisite number of plates for a given volume of well stream to be treated. It is normally preferable to install the plates in a plurality of sections as shown in FIGURE 1 to facilitate handling by reducing the weight of a particular section of plates.

With further reference to FIGURE 2, a drainage channel is formed in the lowermost portion of each plate as represented in the drawing by one continuous vertical channel 32. Material collected on each plate by coalescence thus may drain through the channel into the bottom part of the separator 10. The channel in each plate is formed longitudinally along the length of the plate and it will be recognized that the channel may comprise a multiplicity of apertures or one continuous longitudinal port or any variation thereof so long as their is an adequate opening for drainage and cleanout purposes as will be explained hereafter.

With reference now to FIGURE 3, a horizontal separator 10 similar to that of FIGURE 1 is shown with a plurality of circular coalescing plates 34 wherein the plates are of an approximate half-circle configuration rather than a full circle. The plates conform with and are positioned within the upper portion of the separator vessel 12. Horizontal baffles 36 are spaced and secured along the lower edges of the plates and to the inner wall of the vessel 12 for support purposes and to maintain separation of the gas and liquid phases. Optionally, a transverse dam 38 located and secured within the lower portion of the separator vessel 12 may be provided to further quiet the liquid for level control purposes. Also, an extended liquid drawoff pipe 40 may be placed through an aperture 42 in the transverse dam 38 to draw liquid from the separator.

The half circle plates 34 located in the upper portion of the separator vessel 12 are most clearly shown in FIGURE 4. Liquid material coalescing on the plates 34 drain by gravity flow onto the horizontal baffles 36 and then into the bottom of the separator by flow between the baffles.

Referring now to FIGURE 5, a still further embodiment of the present invention is shown wherein the smooth circular coalescing plates 44 are of a half-circle configuration conforming with and located within the bottom or lowermost portion of the separator vessel 12. Horizontal baffles 36 are again provided for support of the plates 44 and for purposes of maintaining separation of liquid and gas. As shown in FIGURE 6, the half-circle plates 44 each have a drainage channel formed longitudinally in the lowermost portion of the plate as represented by one continuous vertical channel 32.

In operation and with reference to FIGURE 1, a petroleum fluid stream comprising gas and liquids to be separated is passed into the horizontal separator 10 through the inlet nozzle 14. Heavy slugs of liquid are deflected by the deflector or knockout plate 16 whereupon they fall to the bottom of the vessel. Thereupon the well stream flows longitudinally through the annular flow passages 22 formed between the circular plates 20 whereupon heavier liquids settle or precipitate and the gas having lighter entrained liquid particles therein comes in contact with the plates 20 as well as the inner wall of the separator vessel 12. Upon contact of the gas with the plates 20, coalescence of the liquid particles in the gas is induced while the gas continues its longitudinal flow through the separator. It is apparent that the separator can be designed by those skilled in the art so that the proper length and sufficient number of plates within the separator may accomplish effective removal of liquid particles from the gas by the time the gas passes through the outlet nozzle 26. Precipitated liquid and liquid collected on the plates 20 as a result of coalescence will flow around and within the plates by gravity flow into the channel 32 of each plate so that a liquid level is formed in the bottom of the separator and may be drawn off through the liquid outlet 24.

The coalescing plates of full circle configuration as shown in FIGURES 1 and 2 are particularly suitable for separation of liquids from gases in, for example, a well stream containing heavy paraffinic or higher melting point petroleum materials wherein the well stream has a tendency to foam within the separator. The full circle plates 20 extend into the lower or liquid portion of the separator vessel 12 and act to disperse or break up any foam present. When the paraffinic or other heavy material builds up in and around the plates 20, the plates are cleaned effectively by passing steam or other cleaning substances through the separator to dislodge and wash out the trapped material. The circular configuration of the plates 20 permits steam to enter into each annular flow 22 between the plates 20 and melt the heavy trapped material which then flows down the plates into the channel 32. The melted material may then be drawn off as a liquid. Thus accomplished is a simple and expeditious cleaning operation with minimum of down time for the separator.

When the petroleum well fluid stream contains gases and liquids which must be separated and heavy paraffinic or other higher melting point materials but little foam, the embodiment of the present invention as shown in FIGURES 3 and 4 may be used advantageously. It will be recognized that the smooth circular coalescing plates 34 are of an approximate half-circle configuration as contrasted with the full circle configuration of the plates 20 in FIGURES 1 and 2. The half-circle plates 34 conforming with and located in the upper portion of the separator vessel 12 operate in a manner substantially as described for the full circle plate separator with the exception of the ability to break any foam present in the stream.

When the petroleum fluid stream contains only a nominal amount of gas but has at least two immiscible liquid phases such as oil and water to be separated, the embodiment of the present invention as shown in FIGURES 5 and 6 may be used with remarkable success even when such stream contains heavy paraffinic or other higher melting point materials. To accomplish separation of the immiscible liquids as well as the gas, the well fluid stream is passed into the separator 10 through the inlet nozzle 14. Sporadic slugs of liquid are deflected by the knockout plate 16 and the liquid phases are further dispersed by the first horizontal baffle 18. Gas in the well stream passes longitudinally along the upper portion of the separator vessel 12 and is drawn off through the gas outlet 26.

The liquid portion of the well stream containing the two immiscible phases passes through the annular passages 22 formed by the circular plates (shown in half-circle configuration). Assuming the two phases to be oil or petroleum and water, the water phase will contain a multitude of oil droplets dispersed therein while the oil or petroleum phase will contain a multitude of water droplets. As the liquids progress longitudinally through the annular passages 22 of the coalescing plates 44, the water droplets within the oil phase contact one of the plates 44 at some point whereupon the water droplets coalesce with other water droplets and become heavy enough to drop downwardly into the water phase through the drainage channel 32 in each plate. Likewise, the oil droplets within the water phase contact the plates 44 at some point in the travel path, coalesce with other oil droplets and become buoyant enough or gain enough surface tension to rise along the plates 44 up into the oil phase. The liquid outlet nozzle 24 as shown in FIGURE 5 may be adjusted vertically to draw off either water or oil or an additional liquid outlet may be provided to draw off both liquid phases simultaneously.

The horizontal baffles 36 as shown in FIGURES 3 through 6 provide a means for maintaining separation of the liquid and gas phases and suppressing or minimizing entrainment or re-entrainment of liquid into the gas phase.

It will be apparent to those skilled in the art that the embodiments of the present invention as described above may contain circular plates of a full circle, half-circle or any variation of such configurations to accomplish the results described as necessitated for effective separation according to the contents of the particular petroleum well fluid stream to be treated. Furthermore, the thickness, length, diameter and number of coalescing plates required for a particular separator may be determined by those skilled in the art so to effectively separate a particular well stream.

The increased structural strength and rigidity of the circular plates as contrasted with conventional flat plates is a unique advantage of the present invention. The circular plate configuration facilitates fabrication and installation of the coalescing sections as units.

The present invention, therefore, is well adapted to carry out the objects and attain the ends and advantages mentioned as well as others inherent therein. While a presently preferred embodiment of the invention has been given for the purpose of disclosure, numerous changes in the detail of construction and the combination, shape, size and arrangement of parts may be resorted to without departing from the spirit and scope of the invention as hereinafter claimed.

What is claimed is:

1. An improved liquid and gas separator for petroleum fluid streams including,
   an elongate substantially horizontal vessel with a well stream inlet at one end and gas and liquid outlets at points remote from the inlet,
   a plurality of smooth cylindrical plates disposed longitudinally and concentrically spaced within said vessel and constructed so that annular flow passages are provided between the plates,
   support means for securing the plates within the vessel, and
   drainage means formed substantially the length of and in the lowermost portion of each plate and constructed so that material collecting on each plate may communicate with the bottom of the vessel by gravity flow.

2. The invention of claim 1 wherein the smooth cylindrical plates are of a full circle cross-sectional configuration and the drainage means formed substantially the length of and in the lowermost portion of each plate comprises a longitudinal port therein.

3. The invention of claim 1 wherein the smooth cylindrical plates are of an approximate half-circle cross-sectional configuration conforming with and secured within the upper portion of the vessel.

4. The invention of claim 1 wherein the smooth cylindrical plates are of an approximate half-circle cross-sectional configuration conforming with and secured within the lower portion of the vessel and the drainage means formed substantially the length of and in the lowermost portion of each plate comprises a longitudinal port therein.

5. In an improved liquid and gas separator for petroleum fluid streams wherein the separator is of the type having an elongate substantially horizontal vessel with a fluid stream inlet at one end and gas and liquid outlets at points removed from the inlet, the combination with said vessel of the improvement comprising,
   a plurality of smooth cylindrical plates disposed longitudinally and concentrically spaced within said vessel and constructed so that annular flow passages are provided between plates,
   support means for securing the plates within the vessel, and
   drainage means formed substantially the length of and in the lowermost portion of each plate and constructed so that material collecting on each plate may communicate with the bottom of the vessel by gravity flow.

6. The invention of claim 5 wherein the smooth cylindrical plates are of a full circle cross-sectional configuration and the drainage means formed substantially the length of and in the lowermost portion of each plate comprises a longitudinal port, flow of the fluid stream through the annular passages inducing coalescence of liquid particles entrained in the gas.

7. The invention of claim 5 wherein the smooth cylindrical plates are of an approximate half-circle cross-sectional configuration conforming with and secured within the upper portion of the vessel, flow of the fluid stream through the annular passages inducing coalescence of liquid particles entrained in the gas.

8. The invention of claim 5 wherein the smooth cylindrical plates are of an approximate half-circle cross-sectional configuration conforming with and secured within the lower portion of the vessel and the drainage means formed substantially the length of and in the lowermost portion of each plate comprises a longitudinal port, flow of the fluid stream through the annular passages including coalescence and separation of immiscible liquid particles entrained in separate liquid phases.

9. The invention of claim 7 including additionally, a plurality of horizontal baffles spaced from one another and secured within the vessel below the plates for suppressing re-entrainment of liquid separated from gas.

10. The invention of claim 8 including additionally, a plurality of horizontal baffles spaced from one another and secured within the vessel above the plates for suppressing entrainment of liquid into the gas.

References Cited

UNITED STATES PATENTS

| | | | |
|---|---|---|---|
| 2,796,145 | 1/1953 | King | 261—92 X |
| 3,177,126 | 4/1965 | Charreau | 261—92 |
| 2,216,389 | 10/1940 | Hawley | 55—440 X |
| 2,349,944 | 5/1944 | Dixon | 55—1 |
| 2,656,896 | 10/1953 | Glasgow | 55—174 |
| 2,657,760 | 11/1953 | Glasgow | 55—174 |
| 2,717,081 | 9/1955 | Wilson | 55—174 X |

REUBEN FRIEDMAN, *Primary Examiner.*

SAMIH N. ZAHARNA, *Examiner.*

R. BURKS, *Assistant Examiner.*